United States Patent Office 2,920,941
Patented Jan. 12, 1960

2,920,941

METHOD OF SELECTIVELY SEPARATING HYDROFLUORIC ACID FROM ITS SOLUTION WITH OTHER HYDROHALOGENIC ACIDS

Joseph Sanlaville, Pierre-Benite, and Louis Foulletier, Lyon, France, assignors to Societe d'Electro-Chimie d'Electro-Metallurgie et des Acieries Electriques d'Ugine, Paris, France, a corporation of France No Drawing. Application May 14, 1956
Serial No. 584,434

Claims priority, application France May 20, 1955

10 Claims. (Cl. 23—154)

The present invention relates to a method of separation of hydrohalogenic acids, and more particularly for separating hydrofluoric acid from solutions in which it is contained with other hydrohalogenic acids such as hydrochloric acid.

The invention also relates to the practical applications of this method; especially to the manufacture of fluorinated products.

Solutions of hydrochloric acid containing a small quantity of hydrofluoric acid are met with for example when, in the manufacture of fluorinated products, halogenated products are treated with hydrofluoric acid; in these conditions, the halogens other than fluorine are liberated in accordance with the following reaction:

$$RX + HF \rightarrow RF + HX$$

in which X represents the halogens other than fluorine and R is a mineral or organic radical.

When, in order to obtain halogenated compounds, hydrocarbons are treated simultaneously by hydrofluoric acid and a halogen other than fluorine, there is also obtained a main sub-product which is a hydrohalogenic acid other than hydrofluoric acid.

From these processes, the hydrohalogenic acid formed is most frequently separated in the form of an aqueous solution. Irrespective of whatever precautions may be taken in carrying out these processes, the hydrohalogenic acid always contains a certain quantity, generally small, of hydrofluoric acid. The hydrohalogenic acid thus contaminated is not suitable for any commercial use and has to be evacuated. The result is a loss which constitutes a large cost in the manufacture of the corresponding products and, at the same time, difficulties and danger result from the disadvantages inherent in the evacuation into the ground or into water of such hydrohalogenic acids contaminated with hydrofluoric acid.

For a long time, efforts have been made to eliminate the losses and the drawbacks referred to above. It was already known that certain ions became adsorbed at varying speeds on certain adsorbents. But the information actually available concerned the phenomena of pure adsorption, in general in a diluted medium, and made use of large quantities of adsorbent with respect to the substance subjected to the phenomenon. Kubli, for example (Hel. Chem. Acta 30, 453-1947) states in a study relating to chromatography that a column of alumina previously washed with an acid adsorbs various ions and the fluorine ions more rapidly than the chlorine ions; for this purpose, Kubli uses alumina which has been dried between 300 and 600° C.

It has now been found in a quite surprising manner, and this discovery is the basis of the present invention, that it was possible to use relatively small proportions of a suitable alumina in order to eliminate very slightly ionised hydrofluoric acid contained in a solution of another hydrohalogenic acid, without giving rise to any attack on the alumina and without fixation on the alumina of any substantial part of the other hydrohalogenic acid.

These results are all the more astonishing because in general, a high power of fixation pre-supposes a large surface area which, in its turn, involves a high chemical reactivity.

The method of separation of hydrohalogenic acids by means of alumina, and especially the elimination of hydrofluoric acid contained in a solution of another hydrohalogenic acid, consists essentially, in accordance with the present invention, in bringing the solution into contact with a relatively small mass of calcined alumina, which is practically insoluble in the concentrated solution of hydrohalogenic acid and which retains its porosity in such a way as to fix the hydrofluoric acid, and then to separate the hydrohalogenic acid other than hydrofluoric acid.

The alumina to be employed should:

(1) Be completely immune to attack by the other hydrohalogenic acids;

(2) Have an affinity for fluorine ions such that the residuary concentration of hydrofluoric acid in the solution of hydrohalogenic acid may be negligible under the conditions of use. In particular, this content should be so low that there is no corrosion of silica-containing materials with which the acid may come into contact;

(3) Have a capacity of fixation of the fluorine ion sufficient for the quantities of alumina to be used to be kept within economic limits.

In practice, it is possible to use alumina obtained by moderate calcination at about 1,000 to 1200° C. of hydrargillite or of any other hydrate; there may also be employed the products of calcination at similar temperatures of the gels of alumina or amorphous alumina. Examination by means of X-rays shows that essentially alpha alumina is concerned.

The alumina may be used in the form of agglomerates, of pastilles, of balls, of powder, grains or pieces. It is preferable that the granular size should be sufficiently small, since thereby the time of contact necessary for the purifying process is reduced.

Under the conditions of the method described above, the mechanism of fixation of the hydrofluoric acid by alumina has not been entirely explained. It would appear necessary to suppose that it is not a question of a pure adsorption; in fact, the fixation of the hydrofluoric acid is non-reversible, whilst that of the hydrohalogenic acid is reversible; a simple washing with water enables the hydrohalogenic acid adsorbed to be eliminated from the alumina, whilst the whole of the hydrofluoric acid remains fixed; the phenomena is however very selective, since the quantity of hydrofluoric acid fixed is much greater than that of the other hydrohalogenic acid (hydrochloric acid, for example).

In spite of the non-reversibility of the phenomenon with respect to hydrofluoric acid, the alumina which is too highly charged with hydrofluoric acid to maintain a sufficient activity is not lost. In order to separate the other adsorbed hydrohalogenic acid from the alumina, the latter may be washed and then dried, thus recovering alumina charged with fluorine which furthermore it does not lose during calcination. It is also possible, before drying, to neutralise the hydrofluoric acid by means of caustic soda or sodium carbonate; there is then obtained a mixture of aluminium fluoride and sodium fluoride. In all cases, the alumina which has a more or less high content of fluorine or of fluoride of sodium, can be used industrially, for example in the aluminium industry, and this reduces to a very large extent, and even in some cases completely compensates for the cost of raw materials involved in the application of the present method.

The dilute solution, of hydrochloric acid for example, which is derived from the washing stage may be used to adsorb the gaseous hydrohalogenic acids.

The method in accordance with the invention can be especially employed for removing hydrofluoric acid from solutions of hydrochloric acid of any concentration. It is most advantageously applied to the purification of concentrated solutions of hydrochloric acid, that is to say solutions which have a concentration of 300 to 450 grams of anhydrous acid per litre of solution, and which for this reason have a commercial value. These solutions are normally produced by modern apparatus of absorption of hydrochloric acid by washing with water.

The content of hydrofluoric acid in the hydrochloric acid to be purified may attain 10 and even 20 grams per litre. The method in accordance with the invention enables this content to be easily reduced to 0.1 gram per litre and even as low as less than 0.004 gram per litre, if a sufficient quantity of alumina is used, or if a progressive treatment is carried out, that is to say if the acid purified by a first quantity of alumina is then brought into contact with fresh quantities of new alumina.

The method may be carried into effect by means of simple apparatus operating as a continuous process, as a non-continuous process or by combining continuous working with non-continuous working.

For example, the solution can be passed continuously through a movable bed of alumina; the solution to be treated then circulates from the bottom to the top, and from time to time a certain quantity of alumina is withdrawn from the bottom of the bed, whilst an equal quantity is added to the top. The relative rates of use of alumina and of solution, and also of the mass of alumina in the column are regulated in such manner that the concentration of hydrofluoric acid in the purified acid has the desired value, and that the content of hydrofluoric acid in the alumina extracted may be as high as possible.

When the volumes of liquid to be treated are not large, the solution will preferably be allowed to flow through a fixed layer of alumina. When the concentration of purified acid exceeds the admissible value, the flow is stopped and the charge of alumina is replaced. The alumina may also be arranged in fixed separate layers disposed in series: when the charge of the top layer is replaced, this will become the second layer, and so on.

It is also possible to operate non-continuously: the alumina is then kept dispersed in a certain volume of solution, and for this purpose a vat provided in known manner with an agitator is then perfectly suitable. When the concentration of the solution in hydrofluoric acid only changes slowly, the alumina is separated from the solution, for example by decantation or by decantation and filtration.

A satisfactory purification can be obtained by a single treatment, but the consumption of alumina is considerably reduced if the operation is carried out in two or three stages.

The invention will be explained in detail in the following examples of the application of the method which forms its object.

*Example 1*

A solution of hydrochloric acid to be purified, and titrating about 22° Bé., and containing 2 grams of hydrofluoric acid per litre was passed through a layer of alumina powder of 0.3 metre in thickness and with a surface area of 2.3 square metres, the alumina being obtained from Bayer hydrate by calcination between 1,000 and 1200° C. For a rate of flow of solution of 600 litres per hour, the concentration in hydrofluoric acid remained less than 0.1 gram per litre for 20 hours; this means that about 700 kg. of alumina have purified 12,000 litres of solution.

*Example 2*

A vat was charged with 10,000 litres of hydrochloric acid at 22° Bé., containing 2 grams of hydrofluoric acid per litre, and 100 kg. of alumina calcined at between 1,000 and 1200° C. After agitation, the concentration in hydrofluoric acid was brought down to 1 gram per litre. This partly-purified solution was then passed into a second vat similar to the first, in which there was loaded 250 kg. of alumina from the same source as the first. After agitation the concentration had been reduced to 0.1 gram per litre. Thus, 350 kg. of alumina were sufficient to treat 10,000 litres of solution.

*Example 3*

A solution of hydrochloric acid at 22° Bé., containing 0.2 gram of hydrofluoric acid per litre, was percolated at a rate of flow of 250 litres per hour, through a layer of 0.20 metres in thickness, and 1.10 metres in diameter, of an alumina obtained by calcination at 1050° C. for 3 hours. During the first three hours, the concentration in hydrofluoric acid was maintained at a value less than 0.004 gram per litre, after which it rose to 0.020 gram per litre and was maintained at that value for the 12 hours following.

*Example 4*

There was stirred in a vat a solution of hydrochloric acid at 22° Bé., containing 20 grams of hydrofluoric acid per litre, with powdered alumina obtained by calcination for 3 hours at 1050° C., the quantity of alumina used being 190 kg. per cu. m. of solution. After one hour, the concentration in hydrofluoric acid had fallen to 1 gram per litre.

What we claim is:

1. A method of selective separation of hydrofluoric acid from an aqueous solution containing hydrofluoric acid and at least one other hydrohalogenic acid, said method comprising contacting the solution with calcined alumina which is substantially insoluble in the solution and adapted to selectively fix a substantial portion of the hydrofluoric acid from the solution, said alumina being from the group consisting of hydrargillite, alumina gels, alumina hydrates and amorphous alumina, and having been moderately calcined at a temperature greater than about 1000°–1200° C., and separating the alumina and fixed hydrofluoric acid from the solution.

2. A method as recited in claim 1, wherein the calcined alumina consist essentially of alpha alumina.

3. A method as recited in claim 1, wherein said hydrohalogenic acid is hydrochloric acid.

4. A method as recited in claim 1, wherein said calcination is continued for at least about three hours at a temperature between about 1000°–1200° C.

5. A method as recited in claim 1, including neutralizing the separated alumina and recalcining the neutralized alumina.

6. A method as recited in claim 1, including washing the separated alumina with water to remove any hydrohalogenic acid therefrom, and recalcining the washed alumina.

7. A method of selective separation of hydrofluoric acid from an aqueous solution containing said hydrofluoric acid and at least one other hydrohalogenic acid, comprising contacting said solution with a mass of hydrargillite, previously calcined at about 1000°–1200° C., for a period of time sufficient to permit the hydrargillite to fix the hydrofluoric acid, and separating out the mass of hydrargillite after fixation of hydrofluoric acid from the solution.

8. A method of selective separation of hydrofluoric acid from an aqueous solution containing said hydrofluoric acid and at least one other hydrohalogenic acid, comprising contacting said solution with a mass of alumina gels, previously calcined at about 1000°–1200° C., for a period of time sufficient to permit the alumina gels to fix the hydrofluoric acid, and separating out the mass of alumina gels after fixation of hydrofluoric acid from the solution.

9. A method of selective separation of hydrofluoric acid from an aqueous solution containing said hydrofluoric acid and at least one other hydrohalogenic acid, comprising contacting said solution with a mass of alumina hydrates, previously calcined at about 1000°–1200° C., for a period of time sufficient to permit the alumina hydrates to fix the hydrofluoric acid, and separating out the mass of alumina hydrates after fixation of hydrofluoric acid from the solution.

10. A method of selective separation of hydrofluoric acid from an aqueous solution containing said hydrofluoric acid and at least one other hydrohalogenic acid, comprising contacting said solution with a mass of amorphous alumina, previously calcined at about 1000°–1200° C., for a period of time sufficient to permit the amorphous alumina to fix the hydrofluoric acid, and separating out the mass of amorphous alumina after fixation of hydrofluoric acid from the solution.

References Cited in the file of this patent

UNITED STATES PATENTS

| | | |
|---|---|---|
| 1,391,172 | Doremus | Sept. 20, 1921 |
| 1,851,475 | Zimmermann | Mar. 29, 1932 |
| 2,345,696 | Benning et al. | Apr. 4, 1944 |
| 2,413,709 | Hoffman | Jan. 7, 1947 |
| 2,526,776 | Smith et al. | Oct. 24, 1950 |
| 2,686,151 | Feldbauer et al. | Aug. 10, 1954 |